(12) United States Patent
Pigott

(10) Patent No.: US 8,093,515 B2
(45) Date of Patent: Jan. 10, 2012

(54) FISHING NET

(76) Inventor: Jay Pigott, New South Wales (AU)

( * ) Notice: Subject to any disclaimer, the term of this patent is extended or adjusted under 35 U.S.C. 154(b) by 284 days.

(21) Appl. No.: 12/367,165

(22) Filed: Feb. 6, 2009

(65) Prior Publication Data

US 2010/0200308 A1 Aug. 12, 2010

(51) Int. Cl.
*G01G 19/60* (2006.01)
*A01K 77/00* (2006.01)

(52) U.S. Cl. .......... 177/148; 177/245; 43/7; 43/12

(58) Field of Classification Search .......... 177/148, 177/149, 145, 131; 43/7, 12
See application file for complete search history.

(56) References Cited

U.S. PATENT DOCUMENTS

| | | | | |
|---|---|---|---|---|
| 2,003,893 A * | 6/1935 | La Pan | ............ | 73/432.1 |
| 2,129,469 A * | 9/1938 | Hedges | ............ | 177/131 |
| 2,633,351 A * | 3/1953 | Fowle | ............ | 177/131 |
| 2,750,184 A * | 6/1956 | Warndahl | ............ | 177/127 |
| 3,223,189 A * | 12/1965 | Robbins | ............ | 177/131 |
| 4,031,650 A * | 6/1977 | Popeil | ............ | 43/12 |
| 4,631,851 A | 12/1986 | Whitehurst | | |
| 4,765,420 A | 8/1988 | Mengo | | |
| 4,774,783 A * | 10/1988 | Willard | ............ | 43/12 |
| 4,785,897 A * | 11/1988 | Keinert, Jr. | ............ | 177/232 |
| 4,856,605 A * | 8/1989 | Cornelius et al. | ............ | 177/210 R |
| 5,854,447 A * | 12/1998 | Greenwood et al. | ............ | 177/25.14 |
| 6,032,399 A * | 3/2000 | DePoe | ............ | 43/12 |
| 6,094,996 A * | 8/2000 | Campbell et al. | ............ | 73/862.474 |
| 7,891,132 B2 * | 2/2011 | Hetzner | ............ | 43/12 |
| 2005/0005497 A1 * | 1/2005 | Boltan et al. | ............ | 43/7 |

FOREIGN PATENT DOCUMENTS

DE 004127064 A1 * 2/1993 ............ 43/7

* cited by examiner

*Primary Examiner* — Randy W Gibson
(74) *Attorney, Agent, or Firm* — Hunton & Williams

(57) ABSTRACT

A fishing net is described incorporating an electronic weighing device to weigh a fish whilst the fish is still in the net. The fishing net comprises a handle connected to a frame and a water permeable bag coupled to the frame. An electronic weight measuring device measures the weight of a fish or any other marine creature in the water permeable bag. The weighing action requires the user to lift the fishing net out of the water keeping the fishing net in a substantially horizontal position and read the weight from the display.

8 Claims, 2 Drawing Sheets

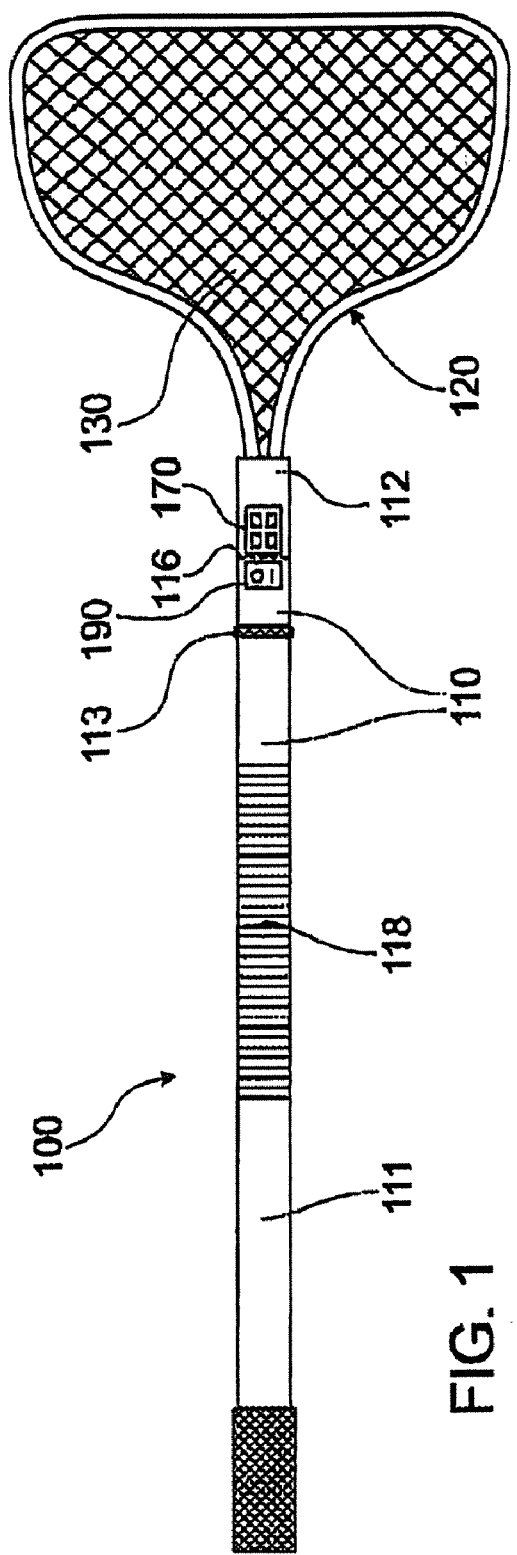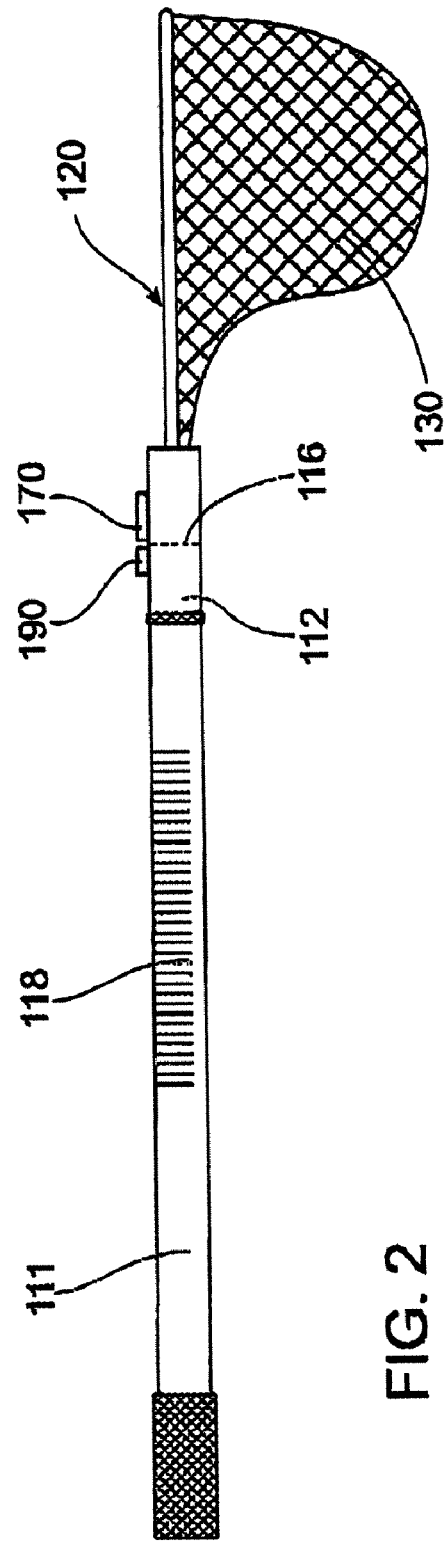

FISHING NET

FIELD OF THE INVENTION

The present invention relates to a device for retaining and weighing fish. In particular the present invention relates to a device for reducing the likelihood of injury to the fish during weighing.

BACKGROUND OF THE INVENTION

Fishing is a sport which is under constant scrutiny from animal welfare groups. Anglers argue that in competition fishing, the fish is caught, weighed and subsequently released causing no harm to the fish.

Many devices are commercially available for weighing fish. One such device is a simple set of weighing scales where the live fish is placed into a weighing pan and the weight is read from a display. The problem with this type of arrangement for weighing live fish is they may fall out of the pan whilst struggling to escape, causing injury or even death. The fish is also kept out of water for a prolonged period of time depriving it of oxygen.

Another device for weighing fish includes a hook on the end of a spring weighing scale. An operator pierces the fish's lip with the hook and the device is lifted vertically to take a reading. A variation of this device uses a clamp to hold the fish's bottom lip. Clearly these two methods exhibit an increased level of interference with the fish and consequential stress and risk.

Two US patents (U.S. Pat. No. 4,631,851 Whitehurst and U.S. Pat. No. 4,765,420 Mengo) have been identified which incorporate mechanical spring scales and a net into one device, the advantage of this arrangement being that the fish do not need to be removed from the net for weighing.

Both US patents disclose a weighing indicator set into the handle of a net and both devices described work in a similar manner. The fish is landed in the net and the hook removed from the fish's lip. The handle of the net is then held up vertically and the fish falls to the bottom of the net. The weight is then read from the display in the handle. The net may then be lowered back into the water and the fish released or kept in the net under water.

The problems with the two inventions above, are firstly when the net is held up to be weighed, the fish may get tangled up in the net when struggling to free itself. Elevation of the net handle causes an automatic wrap around effect on the fish with likely damage to the fins, gills and scales. Secondly, holding the net up vertically is cumbersome especially if the fish is large and may cause an injury to the fisherman. This may be a serious problem on a boat as the fisherman will have to haul the net and fish inboard thereby increasing the time the fish is out of water. Alternatively if he or she is next to the gunwale the risk of falling especially in a swell is significant. Finally the reading from an analogue display is inaccurate and difficult to read.

OBJECT OF THE INVENTION

It is an object to overcome and/or alleviate one or more of the above disadvantages or provide the consumer with useful or commercial use.

SUMMARY OF THE INVENTION

In one form, although not necessarily the only or the broadest form, the invention resides in a fist retaining device comprising;

a handle;
a frame connected to the handle;
a water permeable bag coupled to the frame;
a weight measuring device mounted to one or both of the handle and the frame;
the weight measuring device comprising:
at least one load cell co-operatively coupled to one or both the handle and the frame to provide electric signals, the electric signals present at the load cell corresponding with a weight in the water permeable bag;
a processor in communication with the load cell to analyse the signals;
a digital display in communication with the processor for displaying the weight; and
preferably adapted to receive a power source for powering the weight measuring device.

Preferably the handle is telescopic and may be made of fibreglass, aluminium, stainless steel, carbon fibre or any other suitable material.

Additionally the handle may incorporate a device to measure length preferably inscribed onto the surface of the handle.

The frame may be a triangular, square, rectangular, hexagonal, circular or any other suitable shape. The frame may be made from stainless steel however fibreglass, aluminium, carbon fibre or any other suitable material may be used.

The water permeable bag may be a net or mesh.

The load cell may be at least one strain gauge. Alternatively the load cell may be at least one piezoelectric sensor.

The display device may be a Liquid Crystal Display (LCD), however a Light Emitting Diode (LED) display may be used if preferred.

The power source may be a battery. The battery may be a rechargeable battery with a solar charging circuit.

BRIEF DESCRIPTION OF THE DRAWINGS

By way of example only, preferred embodiments of the invention will be described more fully hereinafter with reference to the accompanying drawings wherein:

FIG. 1 shows a top view of the fishing net

FIG. 2 shows a side view of the fishing net

DETAILED DESCRIPTION OF PREFERRED EMBODIMENT

Figure 3:
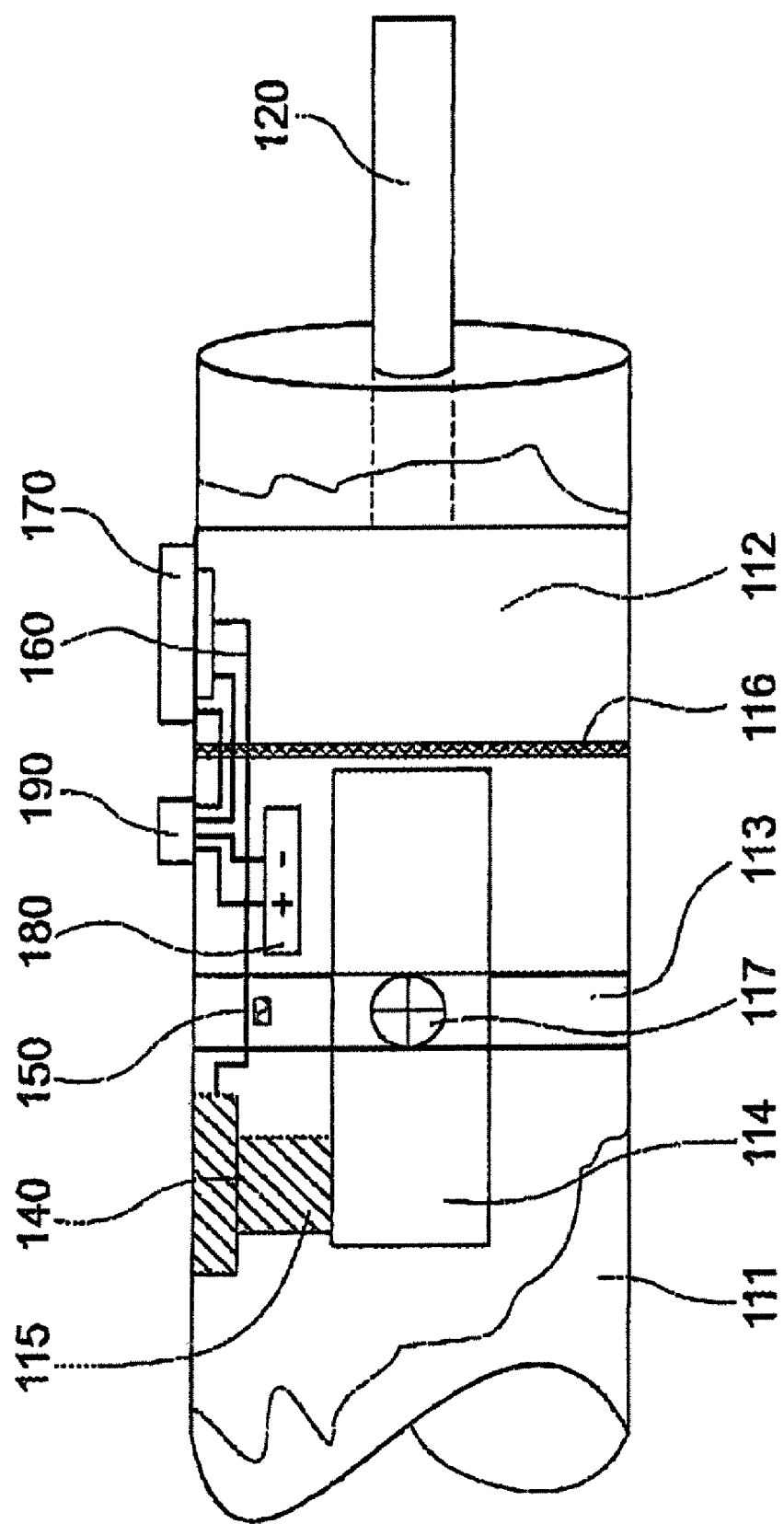
FIG. 3 shows an enlarged cut-away view at the frame/handle connection

The present invention relates to a device for retaining and weighing fish. In particular the present invention relates to a device for reducing the likelihood of injury to the fish during weighing.

One embodiment of the present invention is described below with reference to FIGS. 1 to 3.

FIG. 1 and FIG. 2 show a fishing net 100, with a handle 110. The handle comprises a telescopic section 111 and a lower section 112. The handle 110 may be made from fibre-glass, carbon fibre, aluminum or any other material known to a person skilled in the art. A measuring scale 118 may be incorporated into the handle 110. The measuring scale 118 may be etched, adhered to or fixed in any other way to the handle 110. The lower handle 112 and the telescopic handle 111 are connected using a friction fitting connection to a seal 113. The lower handle 112 and the telescopic handle 111 may additionally be glued or bolted to the seal 113. The seal 113 may be made out of rubber however any semi-rigid material may be used. An arm 114 may be made from stainless steel, however any rigid material may be used. The arm 114 is passed through a hole in the seal 113 to create a tight fit prior to connecting the telescopic handle 111 and the lower handle 112 to the seal 113. Additionally the arm 114 may be secured using suitable glue. Alternatively the arm 114 may be secured using a nut and bolt or a screw 117.

A frame 120 is fixed to the distal end of the lower handle 112 by using an epoxy resin, bolting, clamping or screwing the frame 120 to the lower handle 112 into position or using any other mechanism as desired. The frame 120 may be triangular in shape however the shape may be square, rectangular, circular, hexagonal or any other shape. The frame 120 may be made from stainless steel however any material such as carbon-fibre, aluminum, fibre-glass, timber may be used.

A water permeable bag is coupled to the frame 120. The water permeable bag in this embodiment is a net 130, however any other material, which can be manufactured to provide a porous surface such as cotton and plastic, may be used. The net 130 can be any volume required for a particular design. The net 130 is coupled to the frame by stitching.

A load cell 140 is fixed inside the proximal end of the telescopic handle 111 using glue, self adhesive tape or any other method to fix the load cell 140 in place. Alternatively the load cell 140 may be fixed to the lower handle 112. The load cell 140 may be a strain gauge. Alternatively a Piezoelectric transducer may be used or indeed any other transducer known to a person skilled in the art. The load cell 140 is positioned inside the telescopic handle 111 such that the arm 114 is in constant contact with the load cell 140. In the case of a strain gauge different amounts of pressure on the strain gauge change the resistance at the terminals of the strain gauge. One or more strain gauges may be arranged in a Wheatstone bridge arrangement or any other method as is well known in the art. A shim 115 may be fixed by using glue or any other method onto either the arm 114 or to the surface of the load cell 140 to ensure close contact between the arm 114 and the surface of the load cell 140. In another embodiment of the present invention, the load cell 140 may be attached to the frame 120. In a further embodiment more than one load cell 140 may be attached to the frame 120 and to the handle 110.

An outer seal 116 is fitted between the end of arm 114 and the distal end of the lower handle 112 to prevent the ingress of water.

A signal 150 from the load cell 140 is in electrical communication with a processor 160 using a suitable cable. The signal 150 corresponds directly to the weight in the net 130. The signal 150 may need to be amplified using an amplifier (not shown) inserted between the load cell 140 and the input to the processor 160 as is well known in the art.

The processor 160 analyses the signal 150 and displays the corresponding weight on a display 170. The display 170 may be a Liquid Crystal Display (LCD) display or Light Emitting Diode (LED) display. However any suitable display may be used.

A power source 180 is used to provide electrical power to all of the electronic circuits, including but not limited to the load cell 140, amplifier (not shown), processor 160 and display 170. The processor 160 and the display 170 may be integrated into one device. The power source 180 may be a battery with a solar charging circuit (not shown). A power switch 190 connects the power source 180 to the processor 160 using suitable cables. Alternatively the power switch 190 may be removed and the processor 160 may be woken from a sleep mode when the processor 160 senses a weight in the permeable bag 130 through the load cell 140.

When a weight, such as a fish is placed in the water permeable bag, the weight causes the seal 113 to flex due to its semi-rigid structure and increase a force of the arm 114 on the load cell 140. The greater the weight placed in the water permeable bag 130, the greater the force placed on the load cell 140. In an alternative embodiment, the frame 120 may place a force on the load cell 140.

In use the user throws the power switch 190 to the on position with the fishing net 100 out of the water whilst holding the fishing net 100 in a substantially horizontal position. The user then waits for the processor 160 to zero which is indicated on the display 170. The user then lands the fish in the fishing net 100, removes the hook from the fish's mouth and allows the fish to fall into the bottom of the permeable bag 130. The fishing net 100 is then held substantially horizontal with the fishing net 100 and the permeable bag 130 out of the water. The weight of the fish in the permeable bag 130 will then be shown on the display 170.

Throughout the specification the aim has been to describe the preferred embodiments of the invention without limiting the invention to any one embodiment or specific collection of features.

What is claimed is:

1. A fish retaining device comprising:
a handle including an upper section and a lower section;
a frame connected to the lower section of the handle;
a semi-rigid seal intermediate the upper section and the lower section of the handle;
a water permeable bag coupled to the frame; and
at least one weight measuring device mounted to one or both of the handle and the frame, the weight measuring device comprising:
at least one load cell operatively coupled with the semi-rigid seal to allow the fish retaining device to be used in a substantially horizontal position, wherein the at least one load cell provides electric signals, the electric signals present at the load cell corresponding to a force placed on the load cell and thus a weight in the water permeable bag;
a processor in communication with the load cell to analyse the signals; and
a digital display in communication with the processor for displaying the weight wherein the weight measuring device is adapted to couple with a power source.

2. The fish retaining device of claim 1 wherein:
the upper section of the handle is telescopic and is made of fibreglass, aluminium, stainless steel or carbon fibre; and
the handle incorporates a device to measure length.

3. The fish retaining device of claim 1 further comprising a rechargeable battery with a solar cell as the power source.

4. The fish retaining device of claim 1 wherein the digital display is a Liquid Crystal Display (LCD) or a Light Emitting Diode (LED) display.

5. The fish retaining device of claim 1 wherein the load cell is at least one strain gauge or at least one piezoelectric sensor.

6. The fish retaining device of claim 1 wherein the frame is operatively coupled with the semi-rigid seal and the at least one load cell.

7. The fish retaining device of claim 1 further including an arm operatively coupled with the semi-rigid seal and the at least one load cell.

8. The fish retaining device of claim 7 wherein the arm is disposed within the semi-rigid seal.

* * * * *